(12) United States Patent
Kim et al.

(10) Patent No.: US 7,274,695 B2
(45) Date of Patent: Sep. 25, 2007

(54) METHOD AND APPARATUS FOR PROCESSING ETHERNET DATA FRAME IN MEDIA ACCESS CONTROL (MAC) SUBLAYER OF ETHERNET PASSIVE OPTICAL NETWORK (PON)

(75) Inventors: Seung Hwan Kim, Daejeon (KR); Tae Whan Yoo, Daejeon (KR); Hyeong Ho Lee, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 943 days.

(21) Appl. No.: 10/646,062

(22) Filed: Aug. 22, 2003

(65) Prior Publication Data

US 2004/0100962 A1 May 27, 2004

(30) Foreign Application Priority Data

Nov. 26, 2002 (KR) ...................... 10-2002-0074121

(51) Int. Cl.
*H04L 12/28* (2006.01)
*H04J 3/16* (2006.01)
*H04J 3/24* (2006.01)

(52) U.S. Cl. ................ 370/389; 370/469; 370/474

(58) Field of Classification Search ................ 370/389, 370/390, 392, 409, 469, 474
See application file for complete search history.

(56) References Cited

U.S. PATENT DOCUMENTS

| | | | |
|---|---|---|---|
| 2003/0048801 A1* | 3/2003 | Sala et al. .................. | 370/445 |
| 2003/0091045 A1* | 5/2003 | Choi et al. .................. | 370/390 |
| 2003/0117998 A1* | 6/2003 | Sala et al. .................. | 370/351 |
| 2003/0137975 A1* | 7/2003 | Song et al. .................. | 370/353 |
| 2003/0190168 A1* | 10/2003 | Song et al. .................. | 398/168 |
| 2004/0114592 A1* | 6/2004 | Kang et al. .................. | 370/389 |
| 2005/0100036 A1* | 5/2005 | Davis .......................... | 370/432 |

\* cited by examiner

*Primary Examiner*—Seema S. Rao
*Assistant Examiner*—Hong Sol Cho
(74) *Attorney, Agent, or Firm*—Blakely Sokoloff Taylor & Zafman

(57) ABSTRACT

A method and apparatus for processing Ethernet data frames in a media access control (MAC) sublayer of an Ethernet passive optical network (PON) are provided. The apparatus for processing protocol layers of an Ethernet passive optical network (PON) includes: an Emulation sublayer processing unit which performs cyclic redundancy check (CRC) on information included in a preamble of an Ethernet data frame transferred from a physical layer processing unit, and extracts LLIDs from the preamble; a MAC sublayer processing unit, which has one MAC address corresponding to multiple LLID indexes corresponding to the extracted LLIDs, to perform control and management; a MAC control sublayer processing unit which contains information of the multiple LLID indexes, and performs MAC control on each LLID index; a PON bridge sublayer processing unit which performs a bridge function of the Ethernet PON and tag management of the Ethernet PON; and an Emulated-MAC sublayer processing unit which performs upstream and downstream Ethernet data frame matching, FCS error checking, and PAUSE frame processing. Therefore, an effect exists in that when processing the Ethernet frames, an interface suited to the Ethernet PON system is provided.

10 Claims, 10 Drawing Sheets

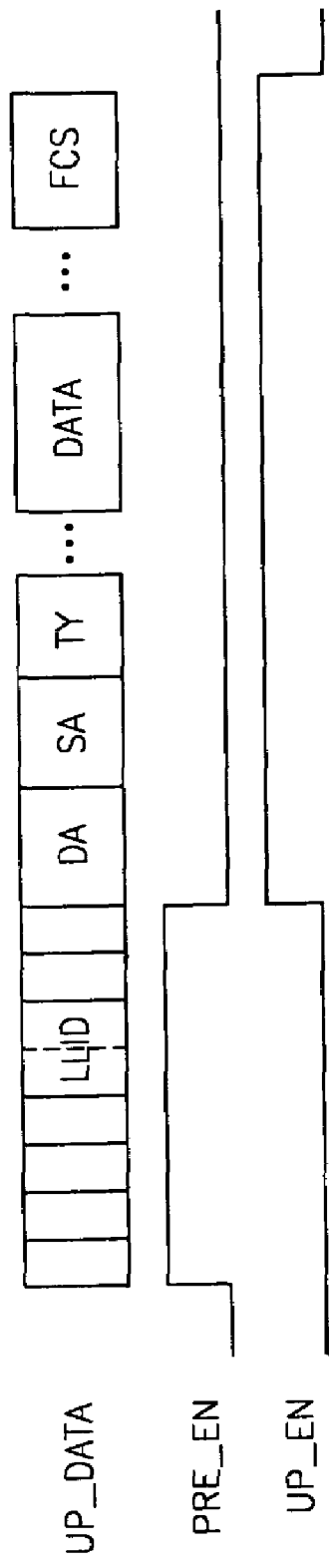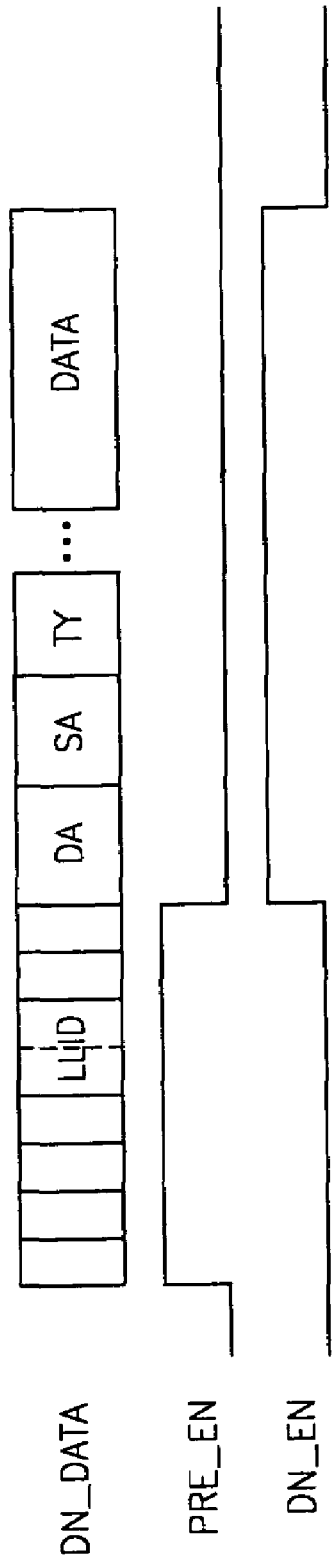

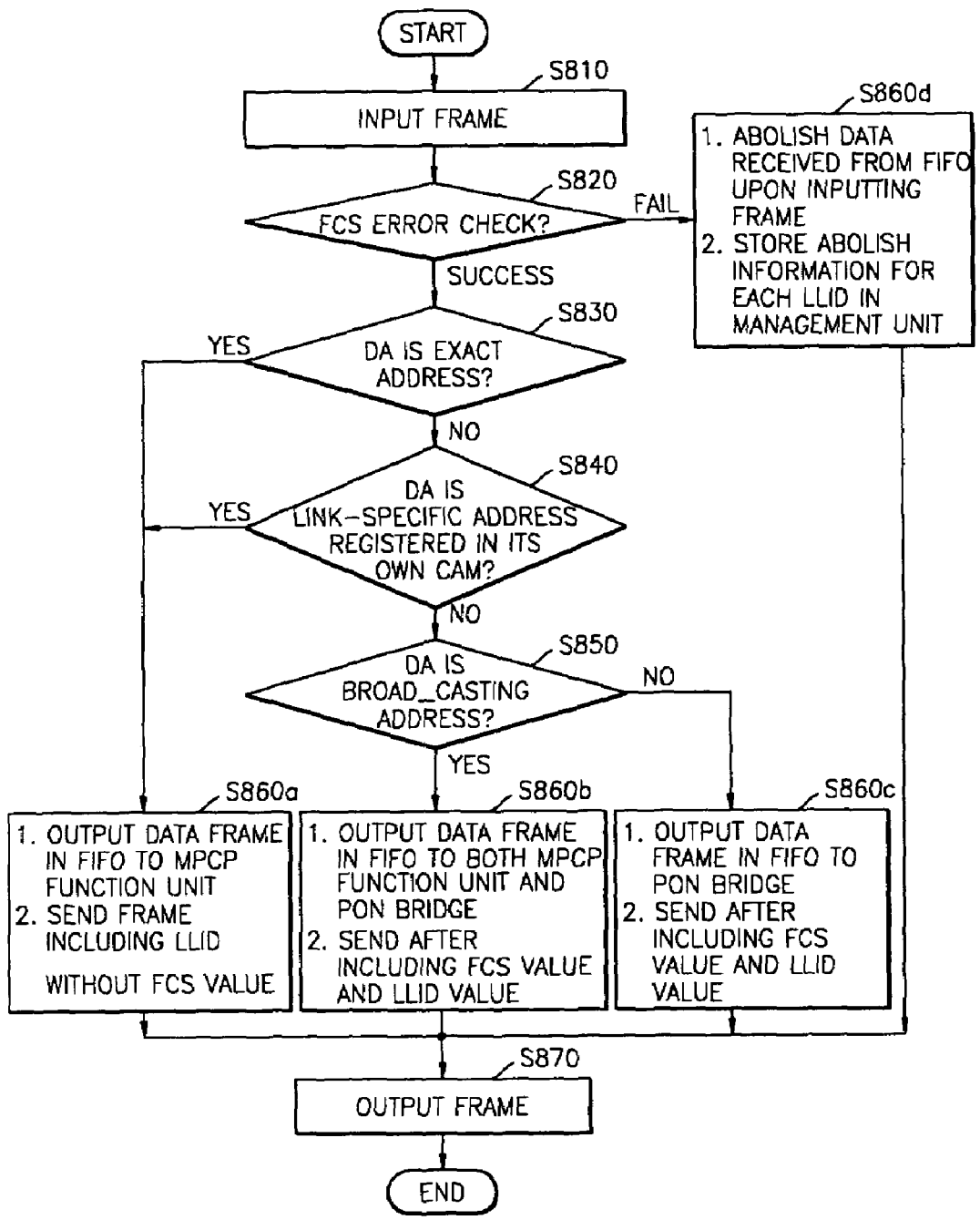

METHOD AND APPARATUS FOR PROCESSING ETHERNET DATA FRAME IN MEDIA ACCESS CONTROL (MAC) SUBLAYER OF ETHERNET PASSIVE OPTICAL NETWORK (PON)

BACKGROUND OF THE INVENTION

This application claims the priority of Korean Patent Application No. 2002-74121, filed on Nov. 26, 2002, in the Korean Intellectual Property Office, the disclosure of which is incorporated herein in its entirety by reference.

1. Field of the Invention

The present invention relates to an optical subscriber network, and more particularly to a method and apparatus for processing Ethernet data in a media access control (MAC) sublayer of an Ethernet passive optical network (Ethernet-PON).

2. Description of the Related Art

Passive optical networks (PONs) represent a network structure which connects access nodes and optical line terminations (OLTs) through optical splitters using a point-to-multipoint configuration. These passive optical networks (PONs) are classified into an ATM-PON and an Ethernet-PON according to information exchange methods with the access nodes. Ethernet PONs represent PONs which transmit Ethernet data frames. In the Ethernet PON, an Emulation sublayer checks medium state signals in order to process a primitive signal received from the physical layer, in a media access control (MAC) sublayer. Here, the Emulation sublayer is also called a reconciliation sublayer (RS). A method for transmitting upstream and downstream Ethernet data frames between the Emulation sublayer and the MAC sublayer will be described hereinafter.

The MAC sublayer of the Ethernet PON includes a sending unit for processing downstream data and a receiving unit for processing upstream data. The sending unit generates a frame check sequence (FCS) for only the Ethernet frames transferred using a multi-point control protocol (MPCP) of a MAC control sublayer. The sending unit modifies the Ethernet frame, transferred from an MPCP function unit executing the MPCP, to have the same phase as data transferred from a PON bridge, and then transmits the resultant Ethernet frame. That is, the sending unit processes two types of Ethernet frames transmitted from different sources, so that the two types of Ethernet frames have the same phase. The receiving unit generates an FCS for 8-bit data processed at a 125 MHz rate, performs address filtering of data, also collects various frame information, and stores the collected data in a management information register.

FIG. 1 is a view of the protocol layer structure of a conventional Ethernet PON.

Optical line terminations (OLTs) and optical network units (ONUs) have the same protocol layer structure, including: a PCS+PMA+PMD sublayer 170 as the physical layer for processing a physical coding sublayer (PCS), a physical medium attachment (PMA), and a physical medium dependent (PMD); a gigabit media independent interface (GMII) sublayer 160; an Emulation sublayer 150; a plurality of MAC (media access control) sublayers 140; a plurality of MAC control sublayers 130; a PON bridge sublayer 120; and an Emulated MAC sublayer 110.

The Emulated MAC sublayer 110 performs upstream and downstream Ethernet frame matching, frame check sequence (FCS) error checking, a PAUSE frame processing, etc. The PON Bridge sublayer 120 performs the basic bridge functions of an Ethernet PON and PON tag management. In the OLT, the MAC control sublayer 130 performs band allocation, scheduling, and work associated with the other MAC controls. According to IEEE 802.3ah, the multi-point control protocol (MPCP) is recommended as a protocol for controlling PON transmission while satisfying Ethernet frame transmission standards. For this reason, the MAC control sublayer 150 is also called an MPCP function unit.

The downstream processing of the multiple MAC sublayers 140 includes receiving a downstream Ethernet frame transmitted from the MAC control sublayer 130, generating an FCS of a control frame for MPCP in the Ethernet frame, inserting an inter frame gap (IFP) into the Ethernet frame, and performing management information base (MIB) counter management for the Ethernet frame. The upstream processing of the MAC sublayers 140 includes performing FCS error checking, address filtering, and MIB counter management for an upsteam Ethernet frame. In the conventional Ethernet PON protocol layer structure shown in FIG. 1, the multiple MAC sublayers 140 and multiple MAC control sublayers 130, classified based on respective LLIDs (logical link identifications), are provided.

An Emulation sublayer 150 performs CRC (cyclic redundancy check) on information included in the preamble of a data frame transmitted from the physical layer, and extracts the LLID, in order to support data frame processing of the upper MAC sublayer 140. An Emulation sublayer 150 in an ONU performs filtering on a received data frame, and transfers the filtered data frame to an upper layer only if the LLID of the received data frame is identical with the LLID allocated to the Emulation sublayer.

The gigabit media independent interface (GMII) 160 is an interface capable of processing Ethernet frames at a rate equal to or less than 1 gigabit/sec. The PCS+PMA+PMD sublayer 170, as the physical layer, provides an interface with an optical module and optical module apparatus suited to the Ethernet PON.

However, because the conventional Ethernet frame processing method is a method for processing general purpose Ethernet frames, the conventional technique can not be used for processing a specific frame including an LLID. In addition, it is not appropriate to apply the conventional Ethernet frame processing method to transmission apparatuses for an Ethernet PON.

Also, in the conventional technique, since the number of MAC sublayers and MAC control sublayers should amount to so many as the number of LLIDS, many more problems exist compared to when using a simplified layer structure of the present invention, especially considering a case in which required LLIDs are further increased by a minimum of 16 and a maximum of 128.

SUMMARY OF THE INVENTION

The present invention provides a simple and complete sublayer structure which manages the sending/receiving state of an Ethernet frame being transmitted upstream or downstream using multiple LLID indexes, and supports multiple LLIDs using one MAC sublayer with one MAC address.

According to an Ethernet PON type layer structure of the present invention, it is possible to process Ethernet frames efficiently by generating frame check sequence (FCS) values, performing address filtering, analyzing the Ethernet frame, and determining transmission directions (upstream or downstream) of Ethernet frames.

According to an aspect of the present invention, there is provided an apparatus for processing protocol layers of an Ethernet passive optical network (PON), the apparatus comprising: an Emulation sublayer processing unit which performs cyclic redundancy check (CRC) on information included in a preamble of an Ethernet data frame transferred from a physical layer processing unit, and extracts LLIDs from the preamble; a MAC sublayer processing unit, which has one MAC address corresponding to multiple LLID indexes corresponding to the extracted LLIDs, to perform control and management; a MAC control sublayer processing unit which contains information of the multiple LLID indexes, and performs MAC control on each LLID index; a PON bridge sublayer processing unit which performs a bridge function of the Ethernet PON and tag management of the Ethernet PON; and an Emulated-MAC sublayer processing unit which performs upstream and downstream Ethernet data frame matching, FCS error checking, and PAUSE frame processing.

According to another aspect of the present invention, there is provided a method for sending and receiving an Ethernet data frame between an Emulation sublayer and a MAC sublayer, the method comprising: generating an Ethernet data frame which includes LLID information written on a 8-bit preamble header; generating an enable signal for distinguishing the 8-bit preamble area; and extracting the LLID information separately using the enable signal, converting the extracted LLID information into format of an interface used in the Emulation sublayer, and transferring resultant LLID information to a MAC control sublayer.

According to still another aspect of the present invention, there is provided a method of processing downstream data in a MAC sublayer of an Ethernet PON, the method comprising: receiving an Ethernet frame; determining whether the received Ethernet frame is data transferred from an MPCP function unit; if it is determined that the Ethernet frame is data transferred from the MPCP function unit, performing cyclic redundancy check (CRC) to add an frame check sequence (FCS) value to the Ethernet frame, inserting an inter frame gap (IFG) into the Ethernet frame, and extracting LLID from the Ethernet frame, whereas if it is determined that the Ethernet frame is data transferred from a PON bridge sublayer, inserting an IFG into the Ethernet frame and extracting LLID from the Ethernet frame without performing the CRC; and if it is determined that the Ethernet frame is not data transferred from the MPCP function, generating a new FCS value, including the FCS value in the Ethernet frame, and including an LLID value for the Ethernet frame at a preamble interval thereof to thereby output a resultant Ethernet frame.

According to further another aspect of the present invention, there is provided a method of processing upstream data in a MAC sublayer of an Ethernet PON, the method comprising: receiving an Ethernet frame; performing FCS error check of the received Ethernet frame; if any error is found in performing the FCS error check, discarding the current Ethernet frame and storing information indicating that the current Ethernet frame has been discarded, in a register corresponding to an LLID of the Ethernet frame, and if no error is found, extracting a destination address (DA) of the current Ethernet frame, and determining whether the extracted DA is an exact address (one among addresses allocated to the MAC sublayer); if it is determined that the extracted DA is the exact address, outputting the Ethernet frame including an LLID and without an FCS value to an MPCP function unit, and if it is determined that the extracted DA is not the exact address, determining whether the extracted DA is a link specific address; if it is determined that the extracted DA is the link specific address, outputting the Ethernet frame, including the LLID and without the FCS value to the MPCP function unit, and if the DA is not the link specific address, determining whether the DA is a broadcasting address; and if it is determined that the extracted DA is the broadcasting address, simultaneously outputting the Ethernet frame, including both the FCS value and LLID, to both the MPCP function unit and the PON bridge sublayer, and if the DA is not the broadcasting address, outputting the Ethernet frame, including both the FCS value and LLID, to the PON bridge sublayer.

Also, the present invention may be embodied in a general purpose digital computer by running a program from a computer readable medium.

BRIEF DESCRIPTION OF THE DRAWINGS

The above and other features and advantages of the present invention will become more apparent by describing in detail exemplary embodiments thereof with reference to the attached drawings in which:

FIGS. 6a through 6e are views of structures of the Ethernet frames transferred from the MAC sublayer of the Ethernet PON;

FIG. 8 is a flow chart for processing upstream data in the MAC sublayer of the Ethernet PON.

DETAILED DESCRIPTION OF THE INVENTION

Hereinafter, embodiments of the present invention will be described in detail with reference to the appended drawings.

Figure 2:
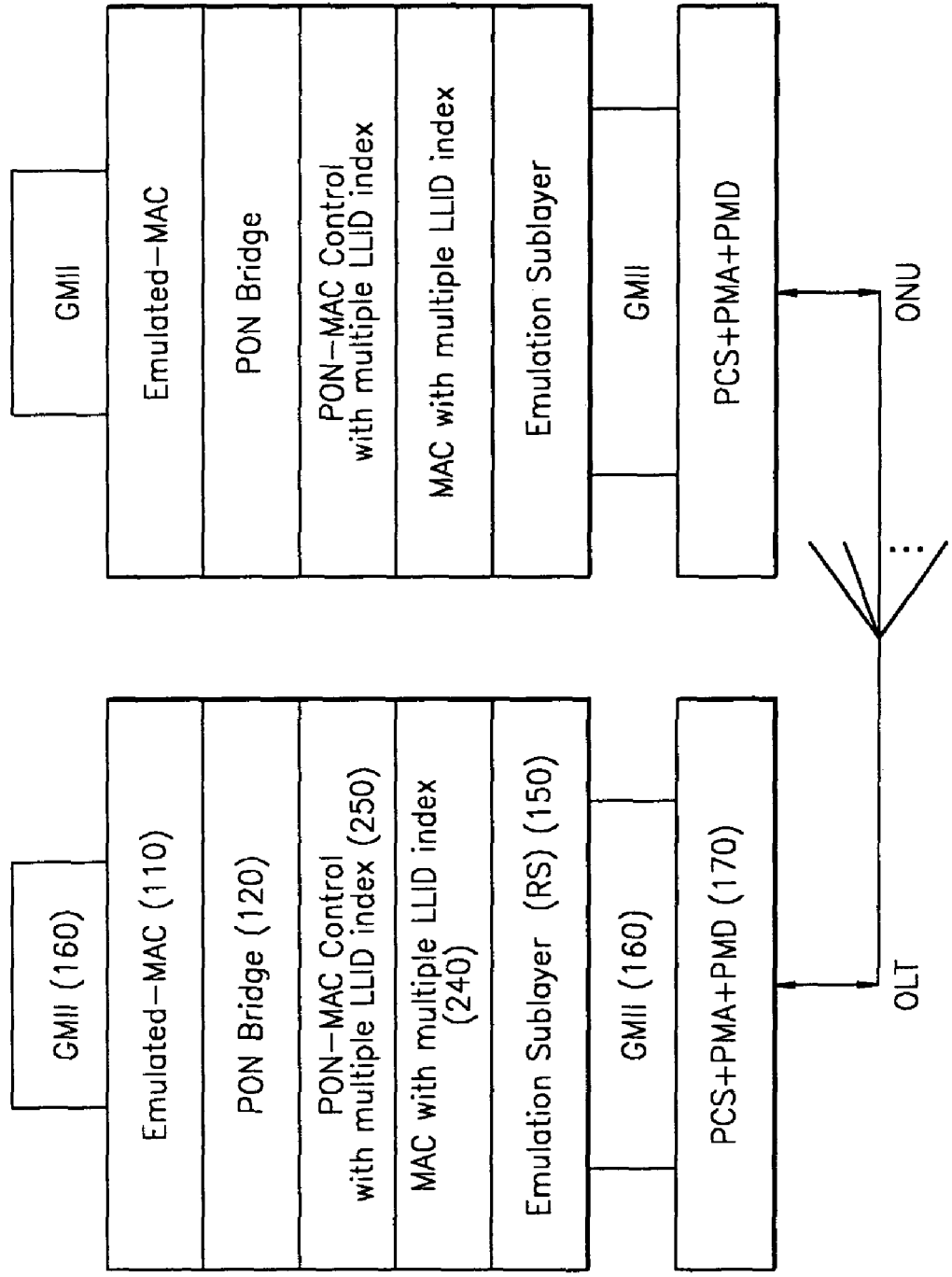
FIG. 2 is a view of the a protocol layer structure of an Ethernet PON according to the present invention.

FIG. 2 is a view of the protocol layer structure of an Ethernet PON according to the present invention.

Figure 1:
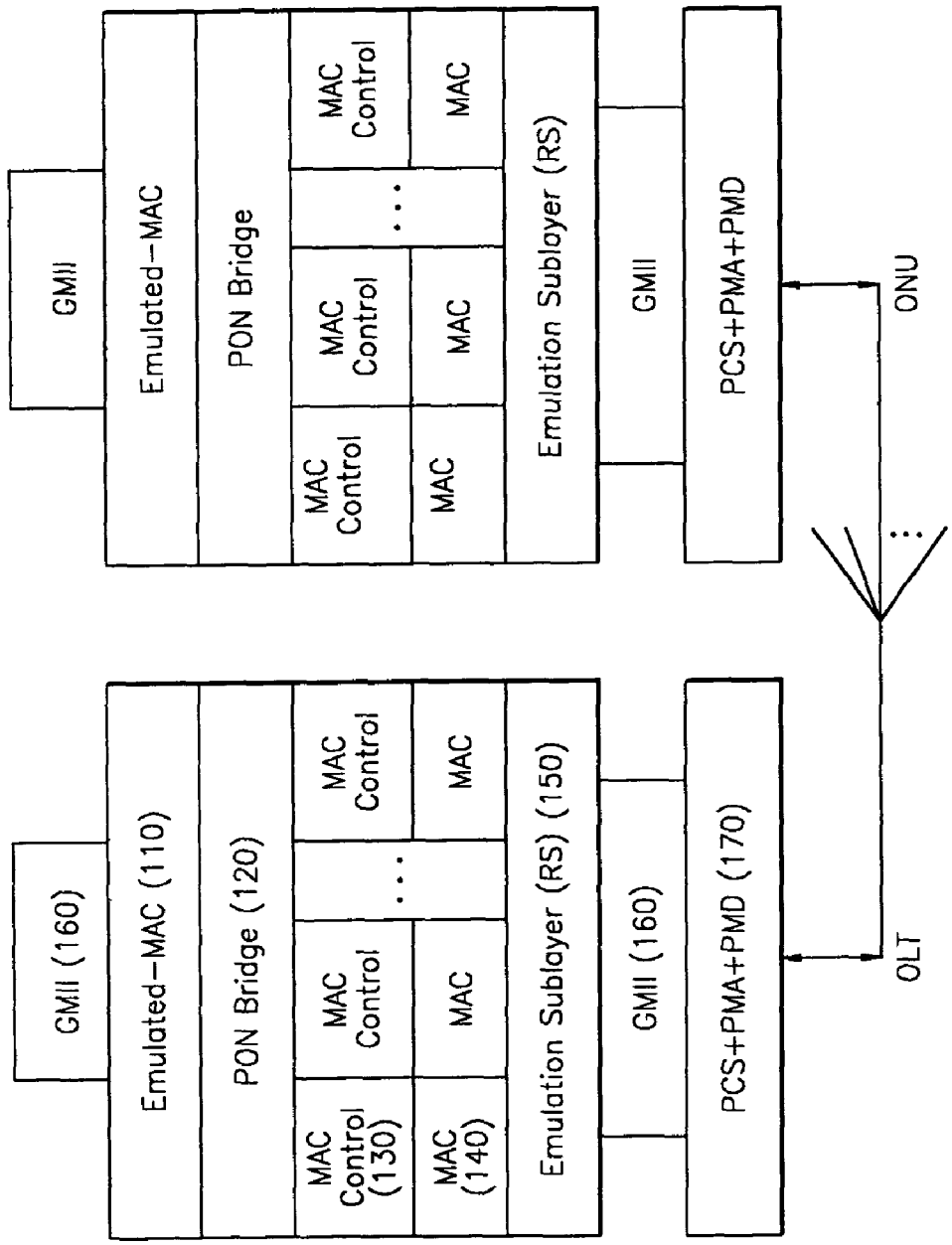
FIG. 1 is a view of the protocol layer structure of a conventional Ethernet PON.

The functions of a MAC control sublayer 250 are the same as those of the MAC control sublayer 130 shown in FIG. 1, except for the support of multiple LLID indexes. A MAC sublayer 240 also performs the same functions as the MAC sublayer 140 shown in FIG. 1, except for using one MAC sublayer structure with one MAC address and processing data frames using multiple LLID indexes. Accordingly, the present structure shown in FIG. 2 performs the same functions as the structure having multiple MAC sublayers 140 and MAC control sublayers 130 as shown in FIG. 1. The remaining sublayers shown in FIG. 2 perform the same function as the remaining sublayers described with reference to FIG. 1.

Figure 3:
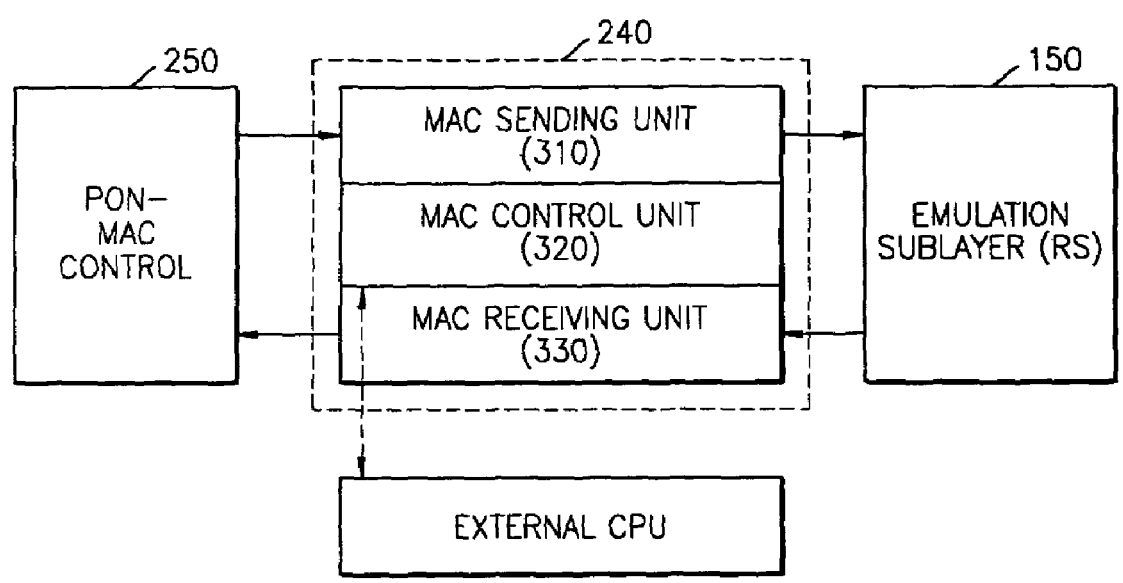
FIG. 3 is a block diagram of a configuration of the MAC sublayer 240 shown in FIG. 2.

FIG. 3 is a block diagram of a configuration of the MAC sublayer 240 shown in FIG. 2.

A MAC sending unit 310 obtains the 32-bit FCS (frame check sequence) for an Ethernet frame transferred from an MPCP function unit, among Ethernet frames transferred from the PON-MAC control sublayer 250, and attaches the obtained FCS to the end of the received Ethernet frame. The MAC sending unit 310 also transfers data (Ethernet frame) from a PON bridge 120, with an FCS, to a lower layer, extracts LLIDs from the data, and designates a MIB counter on each LLID.

A MAC control unit 320 manages various registers related to the MAC sublayer 240, and provides CPU interface functions. A MAC receiving unit 330 performs FCS error checking and address filtering for upstream Ethernet frames, and checks the contents of the received Ethernet frame to determine whether the Ethernet frame is to be transferred to an MPCP function unit or to a PON bridge.

Figure 4:
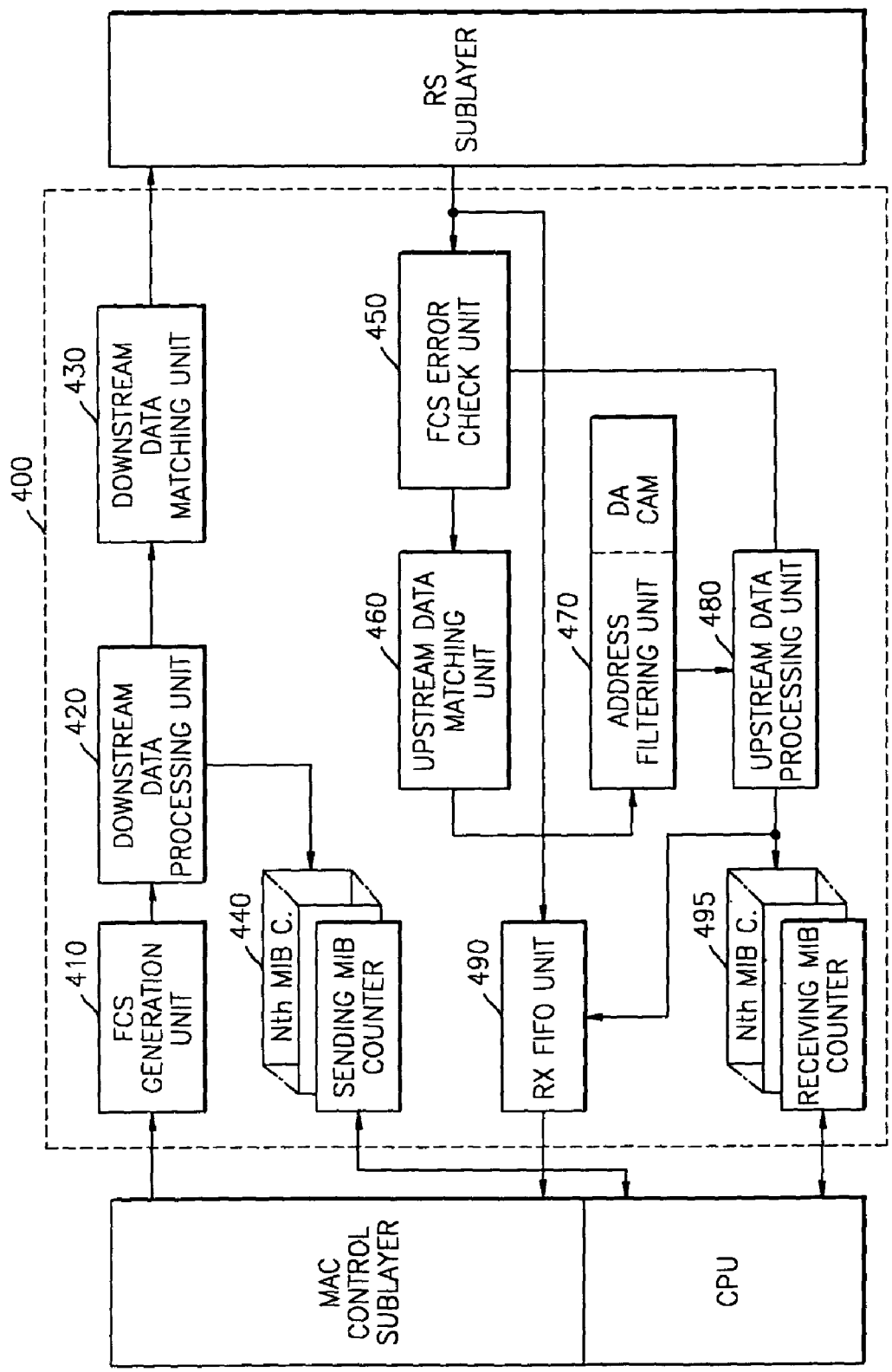
FIG. 4 is a block diagram of a detailed configuration of the MAC sublayer 240 shown in FIG. 3.

FIG. 4 is a block diagram of a detailed configuration of the MAC sublayer 240 shown in FIG. 3.

In FIG. 4, a part 400, designated by dotted lines, corresponds to a portion of a MAC sublayer 240, including the MAC sending unit 310, the MAC control unit 320, and the MAC receiving unit 330 of FIG. 3.

Among the Ethernet frames received from an upper layer (MAC control layer), only data (Ethernet frame) transmitted from the MPCP function unit is used by the FCS generation unit 410 to generate a 32-bit FCS value. The FCS generation unit 410 calculates the CRC from a destination address (DA) field to a final FCS field of the received Ethernet frame. In this regard, Equation 1 below is used.

$$X^{32}+X^{26}+X^{23}+X^{22}+X^{16}+X^{12}+X^{11}+X^{10}+X^{8}+X^{7}+X^{5}+X^{4}+X^{2}+X+1 \quad (1)$$

Before a first byte of data is processed in performing CRC, all values in a CRC shift register should be initialized as "1". An FCS value for the data is obtained using the CRC calculation. The FCS value is attached to the end of the data in the FCS field.

A downstream data processing unit 420 processes data transferred from the upper layer MPCP function unit and data transferred from the PON bridge sublayer, separately. The data from the MPCP function unit is added with the 32-bit FCS value of the FCS generation unit, and a corresponding data enable interval is extended by a length corresponding to the FCS. Here, the data enable interval is an interval where a data enable signal is 'high'. The data enable signal indicates validity of input or output data, wherein if the data enable signal is 'high', the data is valid. The Ethernet frame transmitted from the PON bridge is subjected to retiming in order to have the same internal delay as the FCS processed data, and to remove errors incurred by timing management in the MPCP function unit. At the same time, LLID values included in the preamble intervals of all the Ethernet frames are extracted and, based on the extracted LLIDs, information about transmission states of the Ethernet frames is stored in a sending MIB counter 440.

The downstream data matching unit 430 converts the 32-bit data value processed in the previous step, the step just before the data is input to the downstream data processing unit 420, into an 8-bit data format. This conversion is required by the Emulation sublayer, which only processes data in an 8-bits format.

An FCS error check unit 450 detects whether data (Ethernet frame) is corrupted after receiving the Ethernet frame from a lower layer. The Equation 1 used in the FCS generation unit 410 is the same as the Equation used to calculate the CRC of a received Ethernet frame. Just as in the FCS error check, before a first byte of data is processed, all values of a CRC shift register are initialized respectively to "1". If no error is found after the both CRC calculation and FCS is performed, the remaining value is 'C704DD7B'. In this case, the Ethernet frame has been received without any loss. If any error is found in the FCS error check, contents stored in a receiving FIFO unit are unconditionally discarded, and information indicating that the frame has been discarded is stored in a MIB counter corresponding to the LLID of the corresponding frame.

An upstream data matching unit 460 converts the 8-bit format of the data, passed through the FCS error check unit 450, into a 32-bit format matched with a system clock. This conversion is required since the one gigabit Ethernet PON system processes data of 8 bits at 125 MHz, but processes data of 32 bits at a relatively low speed of 31.25 MHz.

An address filtering unit 470 reads the value of DA field of a received frame and compares them to an address value, thereby allowing the MAC receiving unit to receive only frames with a correct address. The correct addresses are all addresses managed by the MAC receiving unit, as well as exact addresses (its own addresses) allocated to the MAC receiving unit. Generally, broadcasting addresses, which are exact addresses (its own addresses) allocated to the MAC receiving unit, and multiple link-specific addresses, which are registered and allocated to the MAC receiving unit, are stored in content addressable memory (CAM). The DA field of the received frame is checked by being compared with the above-mentioned addresses. The address values stored in CAM are enabled or disabled independently.

If the DA field includes a broadcast address, the current Ethernet frame is to be transferred to both the MPCP function unit and PON bridge, and interface signals, including a data signal and data enable signal are transferred to an upper layer. If the DA field includes an exact address, a signal is created indicating that a current Ethernet frame is to be transferred to the MPCP function unit, and is transferred to the MPCP function unit.

If the DA field does not include a broadcast address or an exact address, a signal is created indicating that a current Ethernet frame is to be transferred to the PON bridge, and is transferred to the PON bridge. The signal is practically transferred to the MAC control sublayer (MPCP function unit). However, because the MPCP function unit determines that corresponding data is directly transmitted to the PON bridge, the statement that the signal is transferred to the PON bridge can be used. In the Ethernet PON system, since a PON bridge function exists in the upper layer, the received frames are unconditionally transferred to the upper layer if no error is found in FCS error checking even if the received DA field of the frame does not include the addresses being compared.

If any error is received in FCS error checking, an upstream data processing unit 480 acquires the LLID information of data input to a receiving (RX) FIFO unit 490, deletes the data, after remaining information indicating that the data has been discarded, in a receiving (RX) FIFO unit 490, and transfers a signal to the upper layer (MAC control sublayer) for determining transmission direction of the Ethernet frame. Transmission direction is determined according to an address filtered result of the address filtering unit 470, which facilitates data processing of the upper layer. The receiving MIB counter 495 stores various management information related to the received Ethernet frame for CPU usage. The Ethernet frame stored in the RX FIFO unit 490 and transmitted to the upper layer is assigned a constant delay timeslot regardless of the size of the frame, in order to remove errors in timing management of the upper MPCP function unit.

Figure 5:
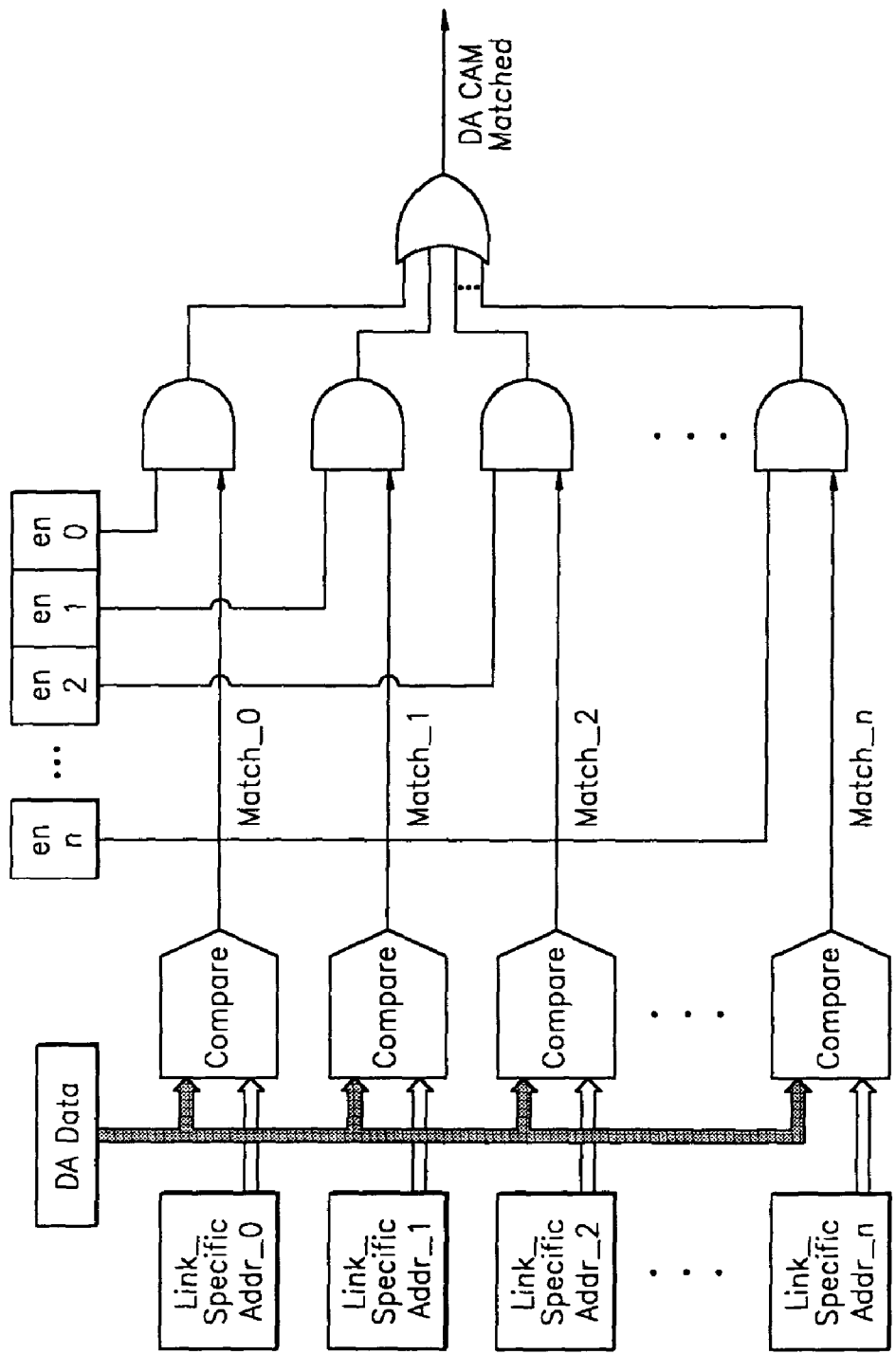
FIG. 5 is a block diagram of a configuration of DA CAM provided in an address filtering unit 470.

FIG. 5 is a block diagram of the configuration of DA CAM provided in the address filtering unit 470.

The DA CAM is memory which compares the address stored therein with inputted addresses, and outputs a value if any one of the inputs is identical to a stored address, wherein the output value is not any value stored in the memory, but a value indicating whether any identical value exists or not. The CAM has N storing spaces and stores the link specific MAC addresses in advance therein, wherein the link specific MAC addresses are managed by a MAC sublayer. Accordingly, when an input address is identical to an address in the CAM, the MAC sublayer transfers a current frame to the upper layer (MPCP function unit).

FIGS. 6a through 6e are views of structures of the Ethernet frames transferred from the MAC sublayer of the Ethernet PON.

Figure 6A:
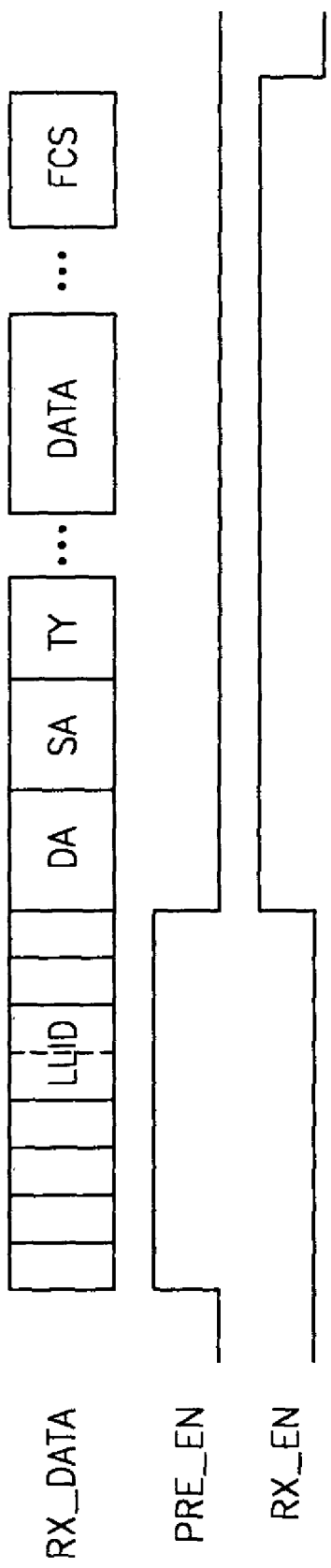

The interface signal between the MAC sublayer and the Emulation sublayer includes an LLID in a 8-bit preamble header of the Ethernet frame, and an enable signal, defined to distinguish the 8-bit preamble of the interface signal, as shown in FIG. 6a. The MAC sublayer extracts the LLID information of the received data for managing the MIB counter, and converts the extracted LLID information into the same format used in the interface signal to transfer to the upper layer.

Figure 6B:
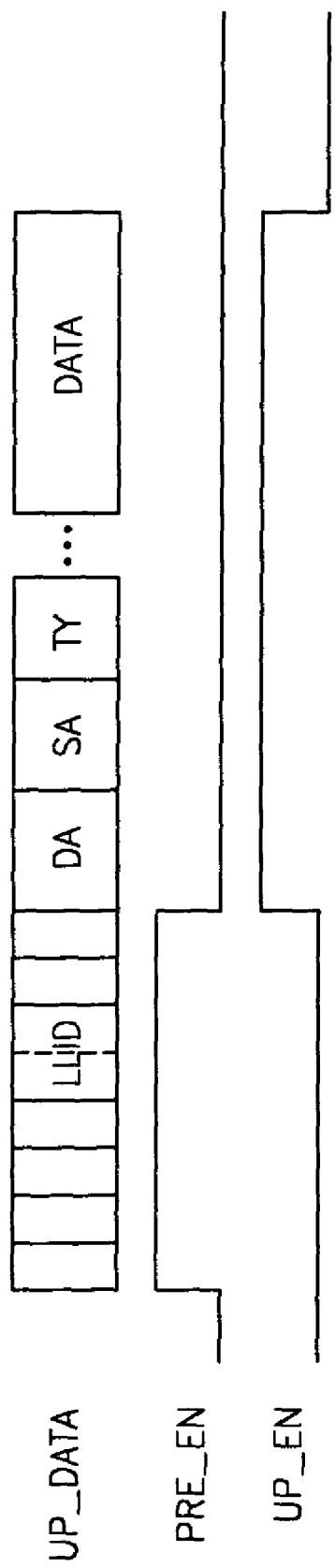
Figure 6E:
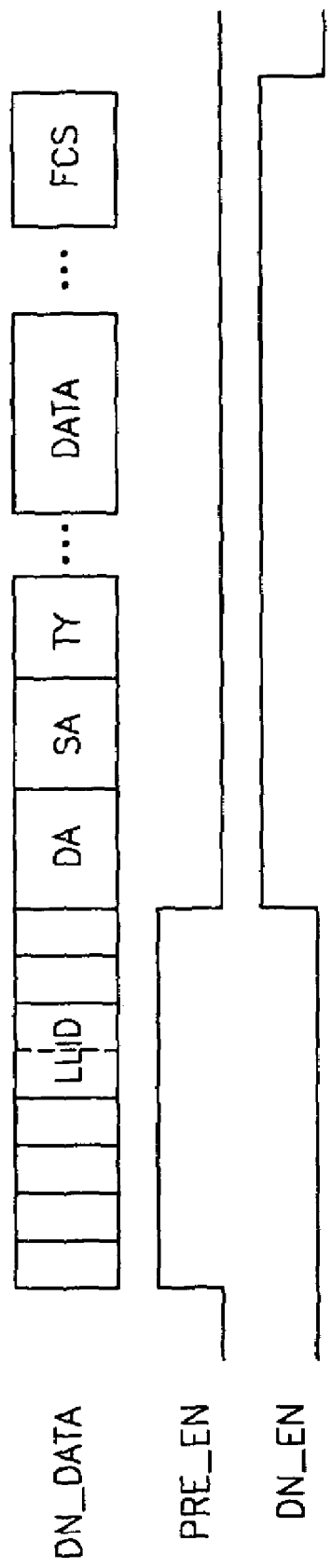

The data transferred to the MPCP function unit is transmitted without an FCS to the upper layer, as shown in FIG. 6b. The data transferred to the PON bridge is subjected to FCS error checking, and then transferred with FCS to the upper layer if no error is found, as shown in FIG. 6c. FIGS. 6d and 6e show structures of the Ethernet frames transmitted between the MAC sublayer and MAC control sublayer. If any downstream data is transferred from the MPCP function unit, the downstream data is transmitted as the structure shown in FIG. 6d. If any downstream data is transferred from the PON bridge, the downstream data is transmitted as the structure shown in FIG. 6e.

Figure 7:
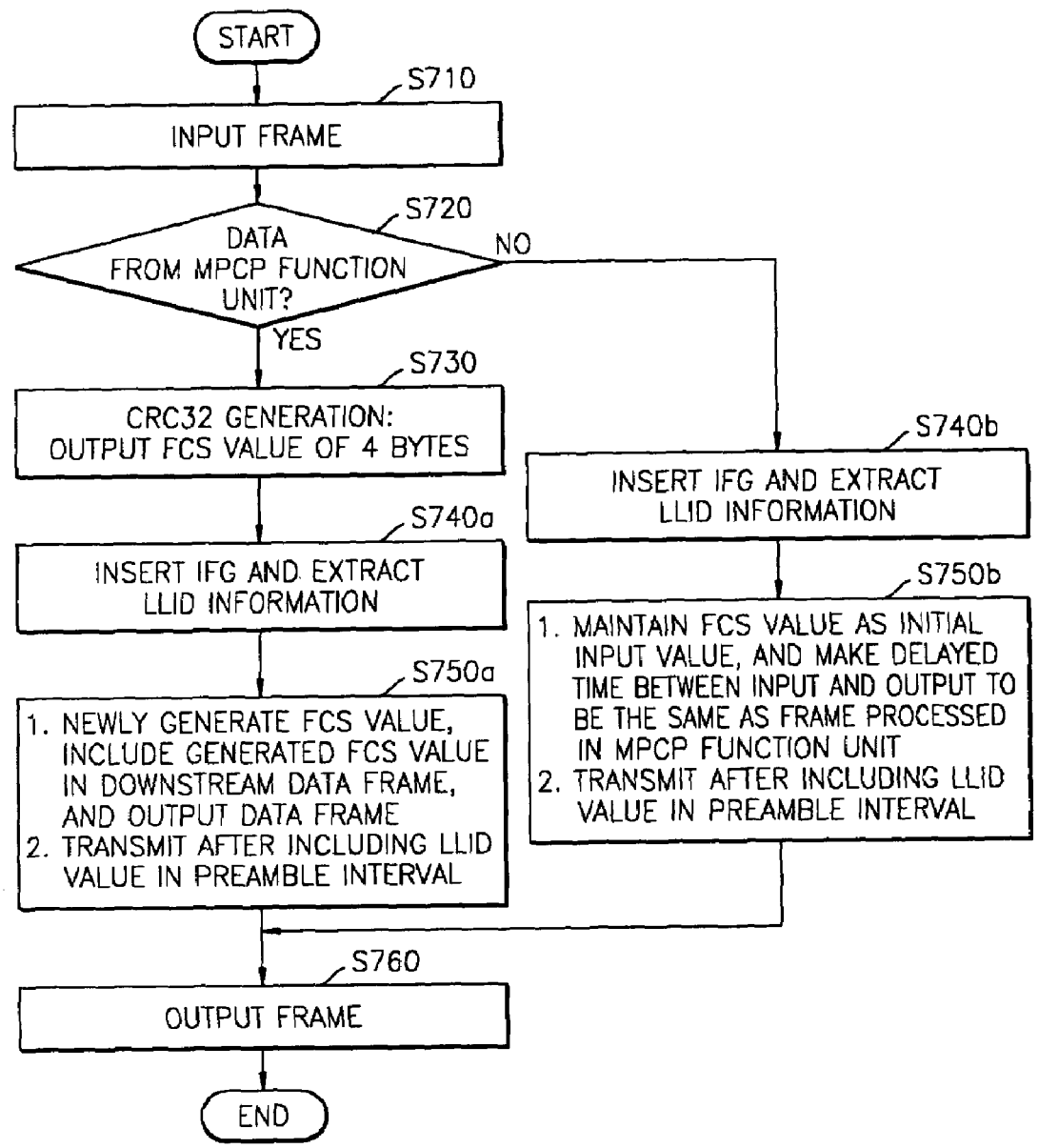
FIG. 7 is a flow chart for processing downstream data in the MAC sublayer of the Ethernet PON.

FIG. 7 is a flow chart for processing downstream data in the MAC sublayer of the Ethernet PON.

First, a downstream Ethernet frame is received (step S710). Then, in step S720, it is determined whether the Ethernet frame is data transferred from the MPCP function unit. This step is required to distinguish data transferred from the upper layer MPCP function unit from data transferred from the PON bridge sublayer. The data from each source is processed separately.

If the data (Ethernet frame) is data transmitted from the MPCP function unit, the data is subjected to CRC generation by the FCS generation unit 410. An FCS value obtained by the CRC is included in the data to be transmitted (step S730). If the Ethernet frame is data transmitted from the PON bridge, the Ethernet frame proceeds to the next step without CRC generation. In step S740a and S740b, an IFG corresponding to a register value is inserted into the Ethernet frame, wherein the register values have IFG values predetermined for all data, and also a LLID value, included in the preamble interval of the Ethernet frame, is extracted.

Then, if the data is data transferred from the MPCP function unit, an FCS value is newly created. The downstream data frame, including the FCS value and an LLID value in the preamble interval is output (step S750a). At this time, the downstream data frame includes a LLID value in the preamble interval thereof (step S750b). If the data is not data transferred from the MPCP function unit, the FCS value maintains an initial input value, and a time delay between an input and an output is made to be the same as in the frame processed in the MPCP function unit. Likewise, at this time, the downstream data frame including a LLID value in the preamble interval thereof is output (step S750b). Then, the Ethernet frame is output (step S760).

FIG. 8 is a flow chart for processing upstream data in the MAC sublayer of the Ethernet PON.

First, an upstream Ethernet frame is input (step S810). The input data is transferred to a RX FIFO and an FCS error check unit, and is subjected to FCS error checking (step S820). If any error is found in the FCS error check, the current frame is discarded, and information indicating that the current frame has been discarded is stored in a register corresponding to the LLID of the data (step S860d).

If no error is found in the FCS error check, it is determined whether the DA of the frame is an exact address (its own address) (step S830). If the DA is the exact address, the Ethernet data frame stored in the FIFO is output to the MPCP function unit, wherein the Ethernet frame including a LLID value is output without the FCS value (step S860a). If the DA is not the exact address, it is determined whether the DA is a link specific address registered in the CAM (step S840). If the DA is a link specific address, the above step (step S860a) is performed, and if the DA is not the link specific address, it is determined whether the DA value is a broadcasting address (step S850).

If the DA is the broadcasting address, the Ethernet data frame stored in the FIFO is output simultaneously to both the MPCP function unit and PON bridge sublayer, wherein the Ethernet data frame includes all the FCS and LLID values (step S860b). If the DA is not the broadcasting address, the Ethernet frame stored in the FIFO is output to the PON bridge sublayer, wherein the Ethernet frame includes all the FCS and LLID values (step S860c). Then, the Ethernet frame is output (step S870).

According to the present invention, it is possible to maintain a processing delay in a MAC receiving unit constant in order to measure RTT for each ONU in an Ethernet PON, and maintain a processing delay of a frame constant regardless of the length of the frame, while not transferring the frame to an upper layer if any error is found in the CRC check of the frame.

As described above, it is also possible to operate an interface between an MPCP function unit and PON bridge sublayer appropriate for an Ethernet PON system, by embodying a plurality of MAC sublayers through one MAC sublayer with one MAC address and using multiple LLID indexes, thereby facilitating the processing of Ethernet frames.

The present invention may be embodied in a general purpose digital computer by running a program from a computer readable medium, including but not limited to storage media such as magnetic storage media (e.g., ROM's, floppy disks, hard disks, etc.), optically readable media (e.g., CD-ROMs, DVDs, etc.) and carrier waves (e.g., transmissions over the internet), The present invention may be embodied as a computer readable medium with a computer readable program code unit embodied therein for causing a number of computer systems connected via a network to affect distributed processing.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus for processing protocol layers of an Ethernet passive optical network (PON), the apparatus comprising:

an Emulation sublayer processing unit which performs cyclic redundancy check (CRC) on information included in a preamble of an Ethernet data frame transferred from a physical layer processing unit, and extracts LLIDs from the preamble;

a MAC sublayer processing unit, which has one MAC address corresponding to multiple LLID indexes corresponding to the extracted LLIDs, to perform control and management;

a MAC control sublayer processing unit with contains information of the multiple LLID indexes, and performs MAC control on each LLID index;

a PON bridge sublayer processing unit which performs a bridge function of the Ethernet PON and tag management of the Ethernet PON; and an Emulated-MAC sublayer processing unit which performs upstream and downstream Ethernet data frame matching, FCS error checking, and PAUSE frame processing.

2. The apparatus of claim 1, wherein the MAC sublayer processing unit comprises:

a MAC sending unit, which obtains a 32-bit FCS for received data, and attaches the FCS to the data and transfers data to the Emulation sublayer if the received data is an Ethernet data frame transferred from an MPCP function unit of the MAC control sublayer processing unit, whereas the MAC sending unit transfers received data to the Emulation sublayer processing unit, in the state of including FCS, if the received data is an Ethernet data frame transferred from the PON bridge sublayer processing unit;

a MAC control unit which manages various registers related to the MAC sublayer processing unit and provides CPU interface functions; and a MAC receiving unit which performs an FCS error check and address filtering for an Ethernet data frame transferred to the MAC control sublayer processing unit, and checks contents of the Ethernet data frame to determine whether the Ethernet data frame is to be transferred to the MPCP function unit or to be transferred to the PON bridge sublayer processing unit.

3. The apparatus of claim 1, wherein the MAC sublayer processing unit comprises:

an FCS generation unit which determines whether an Ethernet data frame received from the MAC control sublayer processing unit is data transmitted from the MPCP function unit or data transmitted from the PON bridge sublayer processing unit, and generates an FCS value of the Ethernet data frame, inserts an inter frame gap (IFG) in the Ethernet data frame, and outputs a resultant Ethernet data frame if the Ethernet data frame is data transmitted from the MPCP function unit;

a downstream data processing unit which extracts LLID information from the Ethernet data frames, and stores transmission state information of the Ethernet data frames, which correspond to the extracted LLID values, in a sending MIB counter;

a downstream data matching unit which converts a 32-bit format of Ethernet frame data transferred from the downstream data processing unit into a 8-bit format of Ethernet frame data to be matched with the Emulation sublayer;

an FCS error check unit which detects whether any Ethernet data frame received from a lower layer is corrupted; an upstream data matching unit, which converts the 8-bit format of data that has passed through the FCS error check unit into a 32-bit format that is matched with a system clock;

an address filtering unit, which reads a value of a destination address (DA) field of a received Ethernet data frame and checks the value included in the DA field; an upstream data processing unit, which transfers a signal to the MAC control sublayer processing unit for determining transmission direction of the Ethernet data frame based on a checked result of the address filtering unit; and an unit which extracts LLID information from upstream data, the unit including a counter for the LLID information, and receives and manages a plurality of MAC addresses through one MAC sublayer processing step.

4. The apparatus of claim 3, wherein the FCS error check unit unconditionally discards contents stored in a receiving buffer if any error is found, and stores information indicating that the contents stored in the receiving buffer have been discarded, in the counter corresponding to the extracted LLID information.

5. The apparatus of claim 3, wherein the address filtering unit comprises a content addressable memory (CAM) having a plurality of storage spaces which pre-stores MAC addresses therein, wherein if an input address is identical to one among the MAC addresses stored in the CAM, the address filtering unit outputs contents of the identical address.

6. A method for sending and receiving an Ethernet data frame between an Emulation sublayer and a MAC sublayer, the method comprising:

generating an Ethernet data frame which includes LLID information written on a 8-bit preamble header;

generating an enable signal for distiguishing the 8-bit preamble area; and extracting the LLID information seperately using the enable signal, converting the extracted LLID information into format of an interface used in the Emulation subplayer, and transferring resultant LLID information to a MAC control sublayer, wherein the transferring the LLID information to the MAC control sublayer, if the Ethernet data frame is to be transmitted to an MPCP functuion unit, the Ethernet data frame is transferred without FCS, and if the Ethernet data frame is to be transmitted to a PON bridge, the Ethernet data frame is transferred with FCS if no error is found after performing the FCS error checking.

7. The method of claim 6, wherein in transferring the LLID information to the MAC control sublayer, if a downstream Ethernet data frame is data transmitted from an MPCP function unit, the downstream Ethernet data frame is transferred without FCS, and if a downstream Ethernet data frame is data transmitted from a PON bridge, the data is transferred with FCS to a PON bridge if no error is found after performing FCS error checking.

8. A method of processing downstream data in a MAC sublayer of an Ethernet PON, the method comprising:

receiving an Ethernet frame;

determining whether the received Ethernet frame is data transferred from an MPCP function unit;

if it is determined that the Ethernet frame is data transferred from the MPCP function unit, performing cyclic redundancy check (CRC) to add an frame check sequence (FCS) value to the Ethernet frame, inserting an inter frame gap (IFG) into the Ethernet frame, and extracting LLID from the Ethernet frame, whereas if it is determined that the Ethernet frame is data transferred from a PON bridge sublayer, inserting an IFG into the Ethernet frame and extracting LLID from the Ethernet frame without performing the CRC; and if it is determined that the Ethernet frame is not data transferred from the MPCP function, generating a new FCS value, including the FCS value in the Ethernet frame, including an LLID value for the Ethernet frame at a preamble intervale thereof to thereby ouput a resultant Ethernet frame.

9. The method of claim 8, wherein if it is determined that the Ethernet frame is not data transferred from the MPCP function unit, the Ethernet frame is output with the LLID value included in the preamble interval thereof as well as the FCS value input initially, wherein a delay time between an input and an output is maintained as the same as in the frame processed by the MPCP function unit.

10. A method of processing upstream data in a MAC sublayer of an Ethernet PON, the method comprising:

receiving an Ethernet frame;

performing FCS error check of the received Ethernet frame;

if any error is found in performing the FCS error check, discarding the currernt Ethernet frame and storing information indicating that the current Ethernet frame has been discarded, in a register corresponding to an LLID of the Ethernet frame, and if no error is found, extracting a destination address (DA) of the current Ethernet frame, and determining whether the extracted DA is an exact address (one among addresses allocated to the MAC sublayer);

if it is determined that the extracted DA is the exact address, outputting the Ethernet frame including and LLID and without an FCS value to an MPCP function unit, and if it is determined that the extracted DA is not the exact address, determining whether the extracted DA is a link specific address;

if it is determined that the extracted DA is the link specific address, outputting the Ethernet frame, including the LLID and without the FCS value to the MPCP function unit, and if the DA is not the link specific address, determining whether the DA is a broadcasting address; and if it is determined that the extracted DA is the broadcasting address, simultaneously outputting the Ethernet frame, including both the FCS value and LLID, to both the MPCP function unit and the PON bridge sublayer, and if the DA is not the broadcasting address, outputting the Ethernet frame, including both the FCS value and the LLID, to the PON bridge sublayer.

* * * * *